(No Model.)
N. SMITH.
COMBINED GRAIN CLEANER AND STOCK FEEDER.
No. 555,909. Patented Mar. 3, 1896.
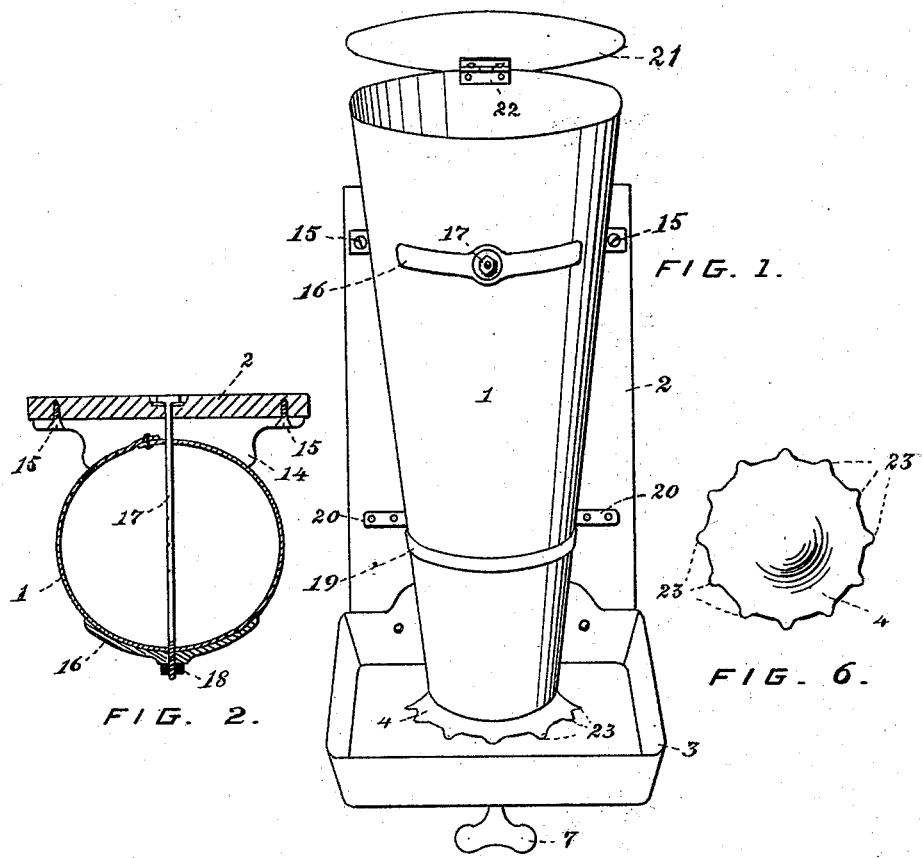
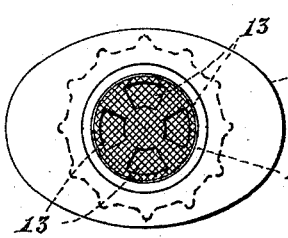
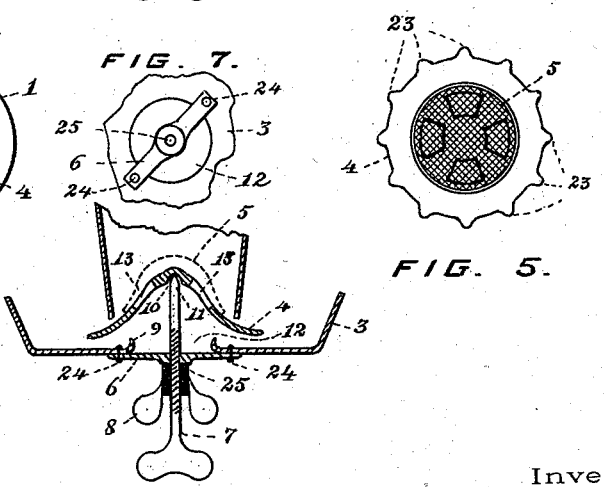
Witnesses:
L. M. Sanders
W. M. Brown
Inventor.
Norton Smith
per John W. Gregg
Attorney.

UNITED STATES PATENT OFFICE.

NORTON SMITH, OF SAGINAW, MICHIGAN.

COMBINED GRAIN-CLEANER AND STOCK-FEEDER.

SPECIFICATION forming part of Letters Patent No. 555,909, dated March 3, 1896.

Application filed April 25, 1894. Serial No. 508,964. (No model.)

*To all whom it may concern:*

Be it known that I, NORTON SMITH, a citizen of the United States, residing at Saginaw, county of Saginaw, State of Michigan, have invented a new and useful Improvement in a Combined Grain-Cleaner and Stock-Feeder, of which the following is a specification.

In the ordinary method of feeding grain from an open feed-box no precaution is usually taken to prevent stock from eating too rapidly or to remove dust and foreign matter from the grain so fed, thereby affording a fruitful cause of many of the diseases incident to grain-fed stock.

My invention relates to improvements in grain-cleaners and stock-feeders wherein the grain to be fed to stock may first be freed from dust particles and foreign matter and at the same time be fed as slowly or as rapidly as desired, thus preventing a tendency to gluttonous eating, as well as a tendency to produce many of the stock diseases consequent upon such gluttonous or intemperate eating.

The device is further designed to prevent inordinate waste of grain, which is so common in the ordinary method of feeding.

To these ends my invention consists of the peculiar construction and novel combination of devices, as more particularly hereinafter specified and claimed.

In the accompanying drawings, forming a part of this specification, like numerals refer to like parts throughout.

Figure 1 is a front view of the device. Fig. 2 is a horizontal section of the upper portion of the device, showing the method of attaching it to any suitable supporting-piece. Fig. 3 is a view looking vertically downward into the hopper of the device, showing also outline plan of the feed-disk with its perforations. Fig. 4 is a vertical section through the lower portion of the device. Fig. 5 is a plan view of a feed-disk, showing the sieve attachment for use when feeding grain. Fig. 6 is a plan view of a feed-disk for use when feeding ground or soft feed. Fig. 7 is a plan view of the under side of the feed-pan, showing the orifice provided for the escape of dust or foreign matter.

The hopper 1 is made of any suitable material, preferably of heavy galvanized iron, and is made oval or of any ordinary form at the top and tapered to a circle at the bottom. It is secured to the support 2 by any suitable means, as by the bolt 17, which passes through the support 2, diametrically through the body of the hopper 1, and through the stiffening-piece 16, being secured in place by the nut 18. The lower part of the hopper 1 is secured to the support 2 by any suitable means, as by the strap 19, held in place by the steps 20 20, which are screwed to the support 2, the entire hopper being held at a suitable distance from the support 2 by the bracket 14, which is also secured to the support 2 by the screws 15 15, as shown in Fig. 2.

At a suitable distance beneath the mouth of the hopper 1 is the feed-pan 3, secured to the support 2 in any desired manner. The feed-pan 3 is provided with the circular opening 12, concentric to and of smaller diameter than the mouth of the hopper. The circumference of the said opening 12 is preferably flanged upward to prevent the overflow of grain and consequent waste thereof.

I do not confine myself to any specific means of supporting the feed-disk 4 and thumb-bolt 7, but for purposes of explanation I will describe a method by which it may be supported.

Diametrically across the opening 12, and rigidly secured to the under side of the pan 3 by any suitable means, as by the rivets 24 24, is the cross-piece 6, provided with the central threaded hole 25 to receive the threaded thumb-bolt 7. This thumb-bolt 7 is provided with the thumb set-nut 8, which, when the bolt 7 is screwed up or down to any desired point, serves to fix it rigidly at that point. Pivotally connected to the upper end of the thumb-bolt 7 and supported thereon is the rotatable feed-disk 4, the periphery of which is provided with the projecting points 23 23, as shown in Figs. 5 and 6. The said disk 4 is made so that the upper side is convex and its lower side is concave.

Interchangeable disks are provided for use with the different kinds of feed. The feed-disk shown at Fig. 5 is provided with the convex sieve 5, rigidly fixed to the upper side of the disk, while the face of the disk is perforated with the holes 13 13 to allow the escape of dust particles in the grain, which drop freely through the opening 12 of the pan 3 beneath, and which would otherwise prove detrimental to the health of the stock if eaten. The other disk, 4, (shown at Fig. 6,) is a solid one of the same outline and general plan, but not provided with the sieve or perforations, being designed for use when feeding ground or soft feed. The hopper 1 may be provided with the cover 21, hinged at 22, with which to close the said hopper and thus prevent the feeding stock from gaining access to the feed within.

The action of the device is as follows: Grain or feed is put into the hopper 1, where it normally rests upon the upper face of the feed-disk 4. The animal feeding at the device immediately begins to press its lip against the projecting points 23 23 upon the periphery of the disk, thereby causing the said disk 4 to rotate and tilt and thus permit a portion of the grain contained in the hopper 1 to run out into the feed-pan 3 to be eaten. The thumb-bolt 7 may be screwed up or down, thus adjusting the space between the lower edge of the hopper 1 and the rim of the feed-disk 4 to any desired width, thereby governing the rate at which the grain is fed to the animal. The constant tilting and rotating of the feed-disk 4 serves to agitate the body of the grain contained in the hopper 1 in such a manner as to cause the particles of dust and foreign matter therein to gravitate to the bottom and it is there sifted through the sieve 5 and falls through the perforations 13 13 of the feed-disk 4 and out of the opening 12 in the bottom of the pan 3.

When in use the device is secured in any suitable manner to the walls of a stall at a convenient height. It is also evident that in the construction of a stall with the ordinary grain-chute and feed-box the disk above specified may be adjusted between without departing from the spirit of my invention.

What I claim as my invention, and desire to secure by Letters Patent, is—

In a grain-cleaner and stock-feeder the hopper and the feed-pan located beneath the mouth of the said hopper and provided with an annular upwardly - projecting flange around the orifice concentric to the mouth of the said hopper in combination with the rotatable concavo-convex feed-disk between the mouth of the said hopper and said feed-pan, extending vertically upward into the mouth of the said hopper, the said feed-disk provided with a series of peripheral projections, and the wire-cloth sieve secured to the upper or convex part of the said feed-disk, and the cross-piece secured to the under side of the said pan diametrically across the circular orifice therein, the said cross-piece provided with a thread-bolt centrally located, the rotatable feed-disk pivotally connected to the upper end of the said threaded thumb-bolt, substantially as and for the purpose set forth.

In testimony whereof I hereunto affix my signature in presence of two witnesses.

NORTON SMITH.

Witnesses:
W. M. BROWN,
L. M. SANDERS.